United States Patent [19]

Wittmann et al.

[11] Patent Number: 4,882,381

[45] Date of Patent: Nov. 21, 1989

[54] MOLDING COMPOUNDS OF AROMATIC POLYESTERS AND GRAFTED SILICONE RUBBER

[75] Inventors: Dieter Wittmann, Krefeld, Fed. Rep. of Germany; Hans-Jürgen Kress, Pittsburgh, Pa.; Ludwig Bottenbruch, Krefeld, Fed. Rep. of Germany; Edgar Leitz, Dormagen, Fed. Rep. of Germany; Horst Peters, Leverkusen, Fed. Rep. of Germany

[73] Assignee: Bayer Aktiengesellschaft, Leverkusen, Fed. Rep. of Germany

[21] Appl. No.: 224,299

[22] Filed: Jul. 26, 1988

[30] Foreign Application Priority Data

Aug. 1, 1987 [DE] Fed. Rep. of Germany ....... 3725576

[51] Int. Cl.$^4$ .............................................. C08L 51/08

[52] U.S. Cl. ................................. 525/63; 264/331.13; 525/445; 525/446

[58] Field of Search ......................... 525/445, 446, 63; 264/331.13

[56] References Cited

U.S. PATENT DOCUMENTS 3,542,900 11/1970 Lammers ............................. 525/446
3,749,757 7/1973 Marzocchi et al. ................. 525/446

Primary Examiner—Melvyn I. Marquis
Attorney, Agent, or Firm—Connolly and Hutz

[57] ABSTRACT

Molding compounds prepared from fully aromatic polyesters and grafted silicone rubber of a specified composition can be worked up into molded bodies with excellent low temperature toughness and uniform surface.

10 Claims, No Drawings

MOLDING COMPOUNDS OF AROMATIC POLYESTERS AND GRAFTED SILICONE RUBBER

This invention relates to thermoplastic moulding compounds based on fully aromatic polyesters and grafted silicone rubber, to a process for their preparation by mixing the components at an elevated temperature and to their use for the production of moulded bodies, particularly by injection moulding.

The term "fully aromatic polyesters" used in the context of this invention includes fully aromatic polyester carbonates.

Moulding compounds based on fully aromatic polyesters containing various additives to improve the impact strength, particularly polyolefines, diene and acrylate rubbers or styrene polymers have already been proposed (EP-A No. 0 119 311). While diene rubbers are unsuitable for certain applications of these moulding compounds on account of their well-known sensitivity to heat and oxidative attack, polyolefines, acrylate rubbers and styrene polymers do not impart the necessary impact strength to the moulding compounds, especially at low temperatures.

Silicone rubbers are well known for their high impact strength even at low temperatures (DE-OS No. 25 39 572) but experience has shown that moulded products obtained from mixtures of fully aromatic polyesters and conventional silicone rubber have an uneven surface.

It has now surprisingly been found that mixtures of fully aromatic polyester and silicone rubber can be worked up into moulded products with good low temperature toughness and improved surface quality if special grafted silicone rubbers are used.

This invention relates to thermoplastic moulding compounds based on

A. 5 to 99% by weight, preferably from 40 to 98% by weight, especially from 60 to 97% by weight. based on the sum of A+B, of fully aromatic polyesters and B. from 1 to 95% by weight, preferably from 2 to 60% by weight, especially from 3 to 40% by weight. based on the sum of A+B, of graft polymers of B.1 from 5 to 90 parts by weight, preferably from 30 to 80 parts by weight, of a mixture of B.1.1 from 50 to 95 parts by weight of styrene, α-methylstyrene, styrenes substituted with halogen or methyl in the nucleus, methyl methacrylate or mixtures of these compounds and B.1.2 from 5 to 50 parts by weight of acrylonitrile, methacrylonitrile, methyl methacrylate, maleic acid anhydride, $C_1$–$C_4$-alkyl-substituted or phenyl-N-substituted maleimides or mixtures of these compounds on B.2 from 10 to 95 parts by weight, preferably from 20 to 70 parts by weight, of silicone rubber having an average particle diameter $d_{50}$ of from 0.09 to 1 μm, preferably from 0.09 to 0.4 μm, and a gel content of more than 50% by weight, preferably more than 70 and especially from 73 to 98% by weight, based on B.2, obtainable from (a) dihalogenated diorganosilane (b) 0 to 10 mol-%, based on (a), of trihalogenated organosilane, (c) 0 to 3 mol-%, based on (a), of tetrahalogensilane and (d) 0 to 0.5 mol-%.based on a), of halogenated triorganosilane, in which the organyl groups of compounds (a), (b) and (d) may denote (α) $C_1$–$C_6$-alkyl or cyclohexyl, preferably methyl or ethyl, (β) $C_6$–$C_{12}$-aryl, preferably phenyl, (γ) $C_1$–$C_6$-alkenyl, preferably vinyl or allyl, and (δ) mercapto-$C_1$–$C_6$-alkyl, preferably mercaptopropyl, under the condition that the sum of (γ+δ) amounts to 2 to 10 mol-%, based on all the organyl groups in compounds (a), (b) and (d). and the molar ratio γ:δ is in the range of (3:1) to (1:3), preferably from (2:1) to (1:2).

Fully aromatic polyesters A in the context of the present invention are aromatic polyesters and aromatic polyester carbonates built up predominantly or exclusively of aromatic $C_8$–$C_{14}$-dicarboxylic acids, $C_6$–$C_{30}$-diphenols and optionally carbonic acid derivatives, e.g. phosgene.

The following are examples of preferred aromatic dicarboxylic acids: Isophthalic acid, terephalic acid, diphenylether-4,4'-dicarboxylic acid and naphthalene-2,6-dicarboxylic acid. Iso- and terephthalic acid are particularly preferred. Phosgene is a preferred carbonic acid derivative.

Compounds corresponding to the following formula are preferred diphenols for the preparation of the fully aromatic polyesters A:

HO—Z—OH    (I)

wherein Z denotes a divalent mononuclear or multinuclear aromatic group containing 6 to 30 carbon atoms such that each of the two OH groups is directly attached to a carbon atom of an aromatic system.

Diphenols corresponding to the following formula II are particularly preferred:

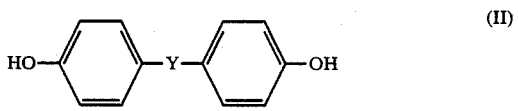

(II)

wherein

Y denotes a single bond, an alkylene or alkylidene group with 1–7 carbon atoms, a cycloalkylene or cycloalkylidene group with 5–12 carbon atoms, O, S,

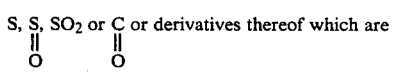

S, S, $SO_2$ or C or derivatives thereof which are or derivatives thereof which are alkylated or halogenated in the nucleus, e.g.

hydroquinone,
resorcinol,
dihydroxydiphenyls,
bis-(hydroxyphenyl)-alkanes,
bis-(hydroxyphenyl)-cycloalkanes,
bis-(hydroxyphenyl)-ethers,
bis-(hydroxyphenyl)-ketones,
bis-(hydroxyphenyl)-sulphoxides
bis-(hydroxyphenyl)-sulphones and
α,α'-bis-(hydroxyphenyl)-diisopropylbenzenes, and the derivatives thereof which are alkylated or halogenated in the nucleus.

The following are the most important diphenols: Bisphenol A. tetramethylbisphenol A, 1,1-bis-(4-hydroxyphenyl)-isobutane, 1,1-bis-(4-hydroxyphenyl)-cyclohexane, 4,4'-dihydroxydiphenylsulphide. 4,4'-dihydroxydiphenylsulphone and their dihalogenated and tetrahalogenated derivatives. Bisphenol-A is particularly preferred but any mixtures of the above-mentioned diphenols may also be used.

Possible branching agents are mentioned in DE-OS Nos. 0 940 024 and 3 007 934.

The chain terminating agents used for the fully aromatic polyesters A are preferably phenol, alkylphenols containing $C_1-C_{12}$-alkyl groups, halogenated phenols-, hydroxydiphenyl, naphthols, chlorocarbonic acid esters of such phenolic compounds and chlorides of aromatic monocarboxylic acids optionally substituted with $C_1-C_{22}$ alkyl groups and halogen atoms these chain terminating agents being preferably used in quantities of from 0.to 10 mol-% (based on the diphenols in the case of phenols and based on acid dichlorides in the case of acid chlorides). The chlorides of aliphatic monocarboxylic acids containing up to 22 carbon atoms may also be used.

Aliphatic units such as adipic acid or butane-1,4-diol may also take part in the synthesis of the fully aromatic polyesters A to an extent of up to 30 mol-% of the dicarboxylic acids and dihydroxy compounds.

The fully aromatic polyesters A may also be partly synthesized from aromatic hydroxycarboxylic acids, e.g. p-hydroxybenzoic acid. The proportion of such hydroxycarboxylic acids may be up to 100 mol-% (based on bisphenol).

When both isophthalic acid and terephthalic acid take part in the synthesis of the fully aromatic polyester A, they may be present in ratios of from 1:20 to 20:1.

The fully aromatic polyester carbonates advantageously contain up to 99 mol-%, in particular up to 80 mol-%. most preferably up to 50 mol-% of carbonate groups, based on the sum of ester groups and carbonate groups.

Both the ester component and the carbonate component of the fully aromatic polyester carbonates A may be present in the polycondensate either in the form of blocks or in random distribution.

The carbonate group content may also be adjusted to the desired level by mixing fully aromatic polyesters with aromatic polycarbonate.

The preparation of fully aromatic polyesters A is known and has been described e.g. in DE-OS Nos. 1 495 626, 2 232 877, 2 703 376, 3 000 610, 2 714 544, 2 940 024 and 3 007 934. The phase interphase process is particularly preferred.

The relative solution viscosity ($\eta_{rel}$) of the fully aromatic polyesters A is in the range of from 1.18 to 1.4, preferably from 1.22 to 1.3 (determined on solutions of 0.5 g polyesters A in 100 ml of $CH_2Cl_2$ solution at 25° C.).

Preferred silicone rubbers B2 are those in which at least 80 mol-% of the organyl groups are methyl groups.

The end group is generally a diorganylhydroxysiloxy unit, preferably a dimethyl-hydroxysiloxy unit.

The silanes (a) to (d) used for the preparation of the silicone rubbers B2 preferably contain chlorine as halogen substituent.

The term "obtainable" in the context of this invention means that the silicone rubber B2 need not necessarily be prepared from the halogen compounds (a) to (d). The definition also covers silicone rubbers B2 of the same structure which have been prepared from silanes containing different hydrolysable groups, e.g. $C_1-C_6$-alkoxy groups.

The silicone rubbers B2 are particulate.

The average particle diameter d is the diameter which is smaller than 50% by weight of the particles and larger than the remaining 50% by weight of the particles. It may be determined by ultracentrifuge measurements (W. Scholtan, H. Lange, Kolloid. Z. und Z. Polymere 250 (1972), 782–796).

The gel content is determined at 25° C. in acetone; see DE-PS No. 2 421 288, column 7, lines 17 –37.

In the process of preparation of the graft polymers B by graft copolymerisation, a certain amount of free polymers or copolymers of the graft monomers which form the graft shell generally form in addition to the graft copolymer proper.

Graft polymers B within the meaning of this invention are therefore products obtained by the polymerisation of graft monomers B.1 in-the presence of the silicone rubber B.2 ; strictly speaking therefore, generally a mixture of graft copolymer and free (co)polymer of the graft monomers B.1.

The moulding compounds according to the invention have optimum properties when the quantity of free (co)polymer does not exceed 50% by weight, preferably 30% weight, in particular 20% by weight, based on component B.

The graft polymers B may be prepared by radical graft polymerisation, for example by a method analogous to that of DE-PS No. 2 421 288, e.g. as follows:

First the silicone rubber B.2 is prepared by emulsion polymerisation of a silicone oligomer.

The preparation of an emulsion of a long chained OH-terminated silicone oil by emulsion polymerisation is well known to the man of the art in principle: see, for example, U.S. Pat. No. 2,891,910 and GB-P No.1 024 24. The process disclosed in the British Patent Specification, in which an alkylbenzene sulphonic acid is used, is particularly preferred because the emulsifier and the polymerisation catalyst are then present as one. The acid is neutralised after polymerisation.

The concentration of emulsifier may therefore be kept low and the finished product does not contain any significant amount of unwanted foreign molecules from the catalyst after preparation of the emulsion. n-Alkylsulphonic acids may also be used instead of the above-mentioned alkylbenzene sulphonic acids. Co-emulsifiers may also be used in addition to the catalytically active sulphonic acid.

These coemulsifiers may be anionic or non-ionic. Suitable anionic co-emulsifiers include in particular salts of the above-mentioned n-alkyl or alkylbenzene sulphonic acids. The non-ionogenic coemulsifiers used may be polyoxyethylene derivatives of fatty alcohols and fatty acids. Examples of such emulsifying agents include POE (3)-lauryl alcohol, POE (20)-oleyl alcohol, POE(7)-nonylphenol and POE (10)-stearate (POE (X)-lauryl alcohol means that X units of ethylene oxide have been added to one molecule of lauryl alcohol, X representing a mean value).

Silicone oils which have been obtained by emulsion polymerisation in the presence of non-ionogenic co-emulsifiers generally have a lower molecular weight than those prepared without co-emulsifier. The molecular weight of the OH-terminated silicone oil resulting from emulsion polymerisation may be controlled, for example, by the temperature at which equilibrium is established between siloxane, water and the silanole initially formed by ring opening of the siloxane (for details of the relationship between temperature and molecular weight, see the work by D. R. Weyenberg et al, J. Polym. Sci., Part C, 27, pages 28 to 34 (1969)).

Groups γ and δ may be introduced into the silicone polymer by operating in the presence of suitable siloxane oligomers. Suitable starting oligomers are, for example, tetramethyl-tetravinyl-cyclotetrasiloxane or γ-mercaptopropyl-methyl-dimethoxysilane or its hydrolysate.

These functional oligomers are added to the main oligomer, e.g. octamethylcyclotetrasiloxane, in the required quantities.

Longer chained alkyl groups such as ethyl, propyl or the like or phenyl groups may also be incorporated in analogous manner.

Sufficient cross-linking of the silicone rubber may be achieved without the addition of an external cross-linking if the groups γ and δ react with one another in emulsion polymerisation but a silane which effects cross-linking may be added to increase the degree of cross-linking of the silicone rubber.

Branching or cross-linking may be obtained by the addition of, for example, tetraethoxysilane or a silane of the general formula organyl-SiX$_3$ in which X is a hydrolysable group, in particular an alkoxy group. Apart from tetraethoxysilane, methyltrimethoxysilane and phenyltrimethoxysilane are also particularly preferred.

For the preparation of the graft copolymer B, the graft monomers B.1.1 and B.2 may be radically graft polymerised in the presence of the silicone rubber, in particular at 40° to 90° C. Graft polymerisation may be carried out in suspension, dispersion or emulsion. Continuous or discontinuous emulsion graft polymerisation is preferred. This graft polymerisation is carried out in the presence of radical initiators (from the group comprising peroxides, azo compounds, hydroperoxides, persulphates and perphosphates) and optionally with the addition of anionic emulsifiers, e.g. carboxonium salts. sulphonic acid salts or organic sulphates. The graft polymers are obtained in high grafting yields, i.e. a high proportion of the polymer of the monomers B.1 is chemically bound to the silicone rubber B.2. This special silicone rubber B.2 obviates the need for special measures (to enable a high degree of grafting).

The graft polymers B prepared as described above may be worked up by known methods, e.g. by coagulation of the latices with electrolytes (salts, acids or mixtures thereof) followed by purification and drying.

The moulding compounds according to the invention may also contain the usual quantities of further additives for aromatic polyesters and graft polymers, such as stabilizers, pigments, mould release agents, flame retardants and antistatic agents.

The moulding compounds according to the invention may be prepared by mixing the components in a known manner and melt compounding or melt extruding them at elevated temperatures, preferably at 250° to 350° C., in the usual apparatus such as internal kneaders, extruders or double shaft screws. The various components may be added successively or simultaneously.

The invention further relates to a process for the preparation of the described moulding compounds by mixing the components at an elevated temperature.

The moulding compounds according to the invention may be used for the production of moulded articles of all types, e.g. by injection moulding. The following are examples of moulded products: Housing parts (e.g. for domestic appliances such as juice extractors, coffee machines or mixers), access panels for the building industry and motor vehicle parts. They are also used for electrical apparatus such as socket strips because they have very good electrical properties.

Moulded bodies may also be produced by deep drawing previously produced plates or films.

The invention further relates to the use of the described moulding compounds for the preparation of moulded articles.

EXAMPLES

Parts given are parts by weight.

A. Fully aromatic polyester carbonate

A polyester carbonate having an ester content of 50 mol-% based on bisphenol-A and isophthalic and terephthalic acid (1:1) containing 3 mol-%. based on the bisphenol-A units, of p-isooctylphenol end groups, having a relative viscosity $\eta_{rel}$ of 1.30 (determined on a solution of 0.5 g of polyester carbonate in 100 ml of $CH_2Cl_2$ at 25° C.).

B. Graft polymer

1. Preparation of the silicone rubber emulsion (B.2)

38.4 Parts of octamethyl-cyclotetrasiloxane, 1.2 parts of tetramethyl-tetravinyl-cyclotetrasiloxane and 1 part of γ-mercaptopropyl-methyl-dimethoxysilane are stirred together 0.5 Parts of dodecylbenzene sulphonic acid are added, followed by 58.4 parts of water within one hour. The mixture is then vigorously stirred. The preliminary emulsion is homogenized twice with the aid of a high pressure emulsifying machine at 200 bar. A further 0.5 parts of dodecylbenzene sulphonic acid is added. The emulsion is stirred for 2 hours at 85° C. and then for 36 hours at 20° C. It is neutralized with 5N NaOH. A stable emulsion having a solids content of about 36% by weight is obtained. The polymer has a gel content of 82% by weight, determined in toluene. The average particle size is 300 nm.

2. Preparation of the graft polymers B 2107 parts of latex B.2 and 1073 parts of water are introduced into a reactor.

After initiation with a solution of 7.5 parts of potassium peroxydisulphate in 195 parts of water at 65° C., the following solutions are introduced at a uniform rate into the reactor within 4 hours:

| | |
|---|---|
| Solution 1 | 540 parts of styrene and 210 parts of acrylonitrile, |
| Solution 2 | 375 parts of water and 15 parts of the sodium salt of $C_{14}$-$C_{18}$—alkyl sulphonic acids. |

The reaction mixture is then completely polymerised within 6 hours at 65° C. A latex having a solids content of about 33% by weight is obtained.

After coagulation with an aqueous magnesium chloride/acetic acid solution, filtration and drying in a vacuum, the graft polymer is obtained in the form of a white powder.

Preparation and testing of the moulding compounds according to the invention

Components A. and B. were melted in a continuously operating double shaft extruder and homogenized (temperature of material 295° C.). The molten strand was degasified before its exit from the nozzle, granulated and dried.

The moulding compounds were worked up in an injection moulding machine to produce rods measuring 2.5×0.5×0.125 inch which were used for measuring the notched impact strength (by the method of Izod) according to ASTM-D-256 at room temperature, −20° C., −40° C. and −50° C.

From this was determined the transition from tough to brittle. i.e. the temperature range in which the first fractures due to brittleness occur.

The following Table shows that the moulded articles obtained had an excellent low temperature toughness. All the samples had completely uniform surfaces. Composition and properties of the moulding compounds

| Example | Components A [% by wt.] | Graft polymer B [% by wt.] | Tough-brittle transition (°C.) |
|---|---|---|---|
| 1 | 90 | 10 | −20/−30 |
| 2 | 85 | 15 | −40/−50 |

We claim:

1. Thermoplastic molding compounds based on:
A. from 5 to 99% by weight, based on the total weight of A and B, of an aromatic polyester, an aromatic polyester carbonate or a mixture thereof
B. from 1 to 95% by weight, based on the total weight of A and B, of a graft polymer of:
B.1 from 5 to 90 parts by weight of a mixture of
B.1.1 from 50 to 90 parts by weight of styrene, α-methylstyrene, styrene substituted with halogen or methyl in the ring, methylmethacrylate or mixture of these compounds and
B1.2 from 5 to 50 parts by weight of acrylonitrile, methacrylonitrile methylmethacry-late, maleic acid anhydride, $C_1$–$C_4$-alkyl-substituted or phenyl-N-substituted maleimide or mixtures of these compounds on
B.2 from 10 to 95 parts by weight of a silicone rubber having an average particle diameter $d_{50}$ of from 0.09 to 1 m and a gel content of more than 50% by weight, based on B.2.

2. Moulding compounds according to claim 1, based on 40 to 98% by weight of component A and from 2 to 60% by weight of component B.

3. Moulding compounds according to claim 1, based on 60 to 97% by weight of component A and 3 to 40% by weight of component B.

4. Moulding compounds according to claim 1, in which the graft polymer B is prepared from 30 to 80 parts by weight of graft monomers B.1 and 20 to 70 parts by weight of silicone rubber B.2.

5. Moulding compounds according to claim 1, wherein the particle diameter $d_{50}$ of the silicone rubber B.2 is from 0.09 to 0.4 μm.

6. Moulding compounds according to claim 1, wherein the gel content of the silicone rubber is more than 70% by weight.

7. Moulding compounds according to claim 1, in which the gel content of the silicone rubber B.2 is from 73 to 98% by weight.

8. Thermoplastic moulding compounds based on:
A. from 5 to 99% by weight, based on the total weight of A and B, of an aromatic polyester, an aromatic polyester carbonate or a mixture thereof
B. from 1 to 95% by weight, based on the total weight of A and B, of a graft polymer of:
B.1 from 1 to 90 parts by weight of a mixture of
B.1.1 from 50 to 90 parts by weight of styrene, α-methylstyrene, styrene substituted with halogen or methyl in the ring, methylmethacrylate or mixtures of these compounds and
B.1.2 from 5 50 parts by weight of acrylonitrile, methacrylonitrile, methylmethacrylate, maleic acid anhydride, $C_1$–$C_4$-alkyl-substituted or phenyl-N-substituted maleimide or mixtures of these compounds on
B.2 from 10 95 parts by weight of a silicone rubber having an average particle diameter $d_{50}$ of from 0.09 to 1 m and a gel content of more than 50% by weight, based on B.2,
wherein said rubber is produced from the polymerization of:
(a) dihalogenated diorganosilane,
(b) from 0 to 10 mol-%, based on (a), of trihalogenated organosilane,
(c) from 0 to 3 mol-%, based on (a), of tetrahalogenated silane and
(d) from 0 to 0.5 mol-%, based on (a), of halogenated triorganosilane, in which the organic substituents of compounds (a), (b) and (d) are
($\alpha$) $C_1$–$C_6$-alkyl or cyclohexyl,
($\beta$) $C_{6\text{-}l}$–$C_{12}$-aryl,
($\gamma$) $C_1$–$C_6$-alkenyl or
($\delta$) mercapto-$C_1$–$C_6$-alkyl
under the condition that said substituent is at least one of γ and δ and the sum of (γ+δ) is from 2 to 10 mol-%, based on all the organic substituents of compounds (a), (b) and (d), and the molar ratio of γ:δ is in the range of from (3:1) to (1:3).

9. Moulding compounds according to claim 8, in which at least 80 mol-% of the organic substituents of components (a), (b) and (d) are methyl groups, the γ groups are vinyl and/or allyl groups and the δ groups are mercaptopropyl groups.

10. A method of producing molded articles comprising molding compounds of claim 1.

* * * * *

UNITED STATES PATENT AND TRADEMARK OFFICE
CERTIFICATE OF CORRECTION

PATENT NO. : 4,882,381

DATED : November 21, 1989

INVENTOR(S) : WITTMANN ET AL

It is certified that error appears in the above-identified patent and that said Letters Patent is hereby corrected as shown below:

On the face of the patent, after "Inventors", please add --Karl-Heinz Ott-- as the fifth inventor.

Signed and Sealed this

First Day of January, 1991

Attest:

HARRY F. MANBECK, JR.

*Attesting Officer*        *Commissioner of Patents and Trademarks*